United States Patent [19]

Henderson et al.

[11] Patent Number: 4,697,791
[45] Date of Patent: Oct. 6, 1987

[54] EXOTHERMIC CUTTING ELECTRODE

[75] Inventors: Harold R. Henderson; David Mosinski, both of Lancaster, Ohio

[73] Assignee: Arcair Company, Lancaster, Ohio

[21] Appl. No.: 815,433

[22] Filed: Dec. 31, 1985

[51] Int. Cl.[4] .............................................. B23K 9/18
[52] U.S. Cl. .................................. 266/48; 219/145.23
[58] Field of Search ..................... 266/48; 219/145.22, 219/145.23, 146.31, 146.52; 110/349; 431/99

[56] References Cited

U.S. PATENT DOCUMENTS

| | | | |
|---|---|---|---|
| 999,099 | 7/1911 | Debus et al. | 266/48 |
| 1,371,094 | 3/1921 | Holslag | 266/48 |
| 1,629,748 | 5/1927 | Stoody | 219/145.22 |
| 1,631,290 | 6/1927 | Sheedy et al. | 266/48 |
| 1,773,653 | 8/1930 | Turner | 219/145.22 |
| 2,345,758 | 4/1944 | Lincoln et al. | 219/10 |
| 2,465,503 | 3/1949 | Woods | 219/145.22 |
| 2,565,477 | 8/1951 | Crowell et al. | 113/110 |
| 2,640,136 | 5/1953 | Ronay | 219/15 |
| 2,785,285 | 3/1957 | Bernard | 219/145.22 |
| 2,802,930 | 8/1957 | Ronay | 219/145.22 |
| 2,805,317 | 9/1957 | Brillie | 219/145.23 |
| 2,806,128 | 9/1957 | Muller | 219/146 |
| 3,036,205 | 5/1962 | Aida et al. | 219/146 |
| 3,147,362 | 9/1964 | Ramsey et al. | 219/146 |
| 3,260,076 | 7/1966 | Humberg | 67/34 |
| 3,364,970 | 1/1968 | Dombruck et al. | 158/27.4 |
| 3,457,388 | 7/1969 | Pokhodnya et al. | 219/146 |
| 3,487,791 | 1/1970 | Dalm | 110/1 |
| 3,491,225 | 1/1970 | Oku | 219/146 |
| 3,500,774 | 3/1970 | Meier | 110/1 |
| 3,507,230 | 4/1970 | Seib | 110/1 |
| 3,507,231 | 4/1970 | Meier | 110/1 |
| 3,531,620 | 9/1970 | Arikawa et al. | 219/146 |
| 3,542,398 | 11/1970 | Huff | 219/146 |
| 3,542,998 | 11/1970 | DeHuff | 219/145.22 |
| 3,570,419 | 5/1971 | Brandenberger | 110/1 |
| 3,591,758 | 7/1971 | Clucas | 219/70 |
| 3,602,620 | 8/1971 | Fassler | 431/99 |
| 3,738,288 | 6/1973 | Brandenberger | 110/1 R |
| 3,866,015 | 2/1975 | Matsumoto et al. | 219/146 |
| 4,069,407 | 1/1978 | Brower | 219/70 |
| 4,114,863 | 9/1978 | Campana | 266/48 |
| 4,182,947 | 1/1980 | Brower | 219/70 |
| 4,391,209 | 7/1983 | Moore | 110/349 |
| 4,401,040 | 8/1983 | Dobi | 110/349 |
| 4,416,444 | 11/1983 | Brower | 266/48 |
| 4,423,855 | 1/1984 | Kallenbach | 266/74 |
| 4,437,649 | 3/1984 | Rieppel et al. | 266/48 |
| 4,541,616 | 9/1985 | Dean | 266/48 |
| 4,544,139 | 10/1985 | Moore et al. | 266/48 |

FOREIGN PATENT DOCUMENTS 2300265 7/1974 Fed. Rep. of Germany .
53-5262 2/1978 Japan .
974115 11/1964 United Kingdom .

*Primary Examiner*—L. Dewayne Rutledge
*Assistant Examiner*—S. Kastler
*Attorney, Agent, or Firm*—James C. Simmons; E. Eugene Innis

[57] ABSTRACT

Exothermic cutting is facilitated by using an electrode fabricated from a single elongated strip of metal roll formed into a generally cylindrical elongated electrode shape. Electrodes can be continuously formed to length by randomly coining the strip before roll forming to facilitate breaking of individual electrodes from the roll formed product.

4 Claims, 3 Drawing Figures

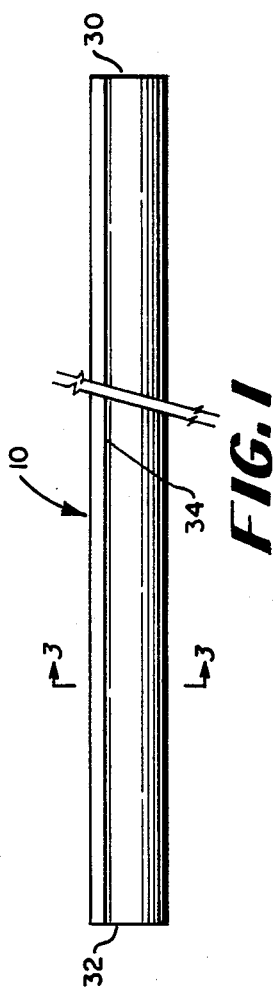
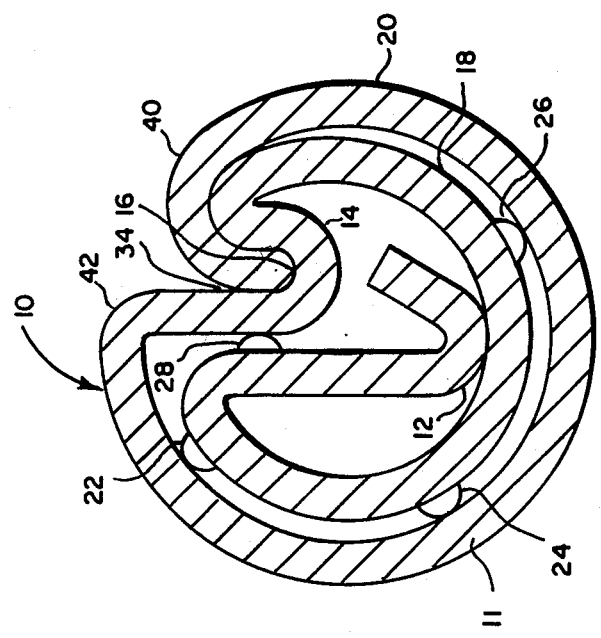

EXOTHERMIC CUTTING ELECTRODE

TECHNICAL FIELD

This invention pertains to exothermic cutting electrodes or burning bars of the type wherein a mass of metal is ignited in the presence of an oxidizing gas (e.g. oxygen) to form a flame or products of combustion which can be directed at a structural shape for cutting or piercing of the structural shape.

BACKGROUND OF THE PRIOR ART

Conventional burning bars which are used on land for cutting structural materials such as rock, stone, concrete, iron and steel are disclosed in any of U.S. Pat. Nos. 3,260,076; 3,507,231; 3,487,791; 3,500,774; 3,507,230; 3,570,419; and 3,738,288. The burning bars shown in the foregoing patents share a common feature in that they have an outer tube within which is placed a plurality of elongated rods or wires to make up a mass of oxidizable metal. Oxygen is conducted down through the outer tube to the end of the rod where combustion is initiated to produce a flame which is directed at the structural material. The preferred burning bars usually contain a readily oxidizable metal (e.g. magnesium or aluminum) as one or more of the rods to promote combustion.

The use of multiple strands in various configurations for arc welding electrodes is shown in U.S. Pat. Nos. 1,773,653; 2,345,758; 2,806,128 and 3,147,362 it being well known that welding electrodes are generally unsuitable for cutting operations.

It has been known for a long time to form a welding electrode from a strip of metal by a roll forming operation. The welding electrode generally contains a flux or a core material to facilitate the welding operation. U.S. Pat. Nos. 2,565,477; 2,785,285; 3,036,205; 3,457,388; 3,491,225; 3,531,620; 3,542,998; and 3,866,015 disclose and claim such electrodes. A flux cored electrode is a continuous electrode in the form of wire coils used for weld metal deposition rather than cutting. Flux cored electrodes (wire) require continuous application of welding (electric) current through the wire in order to perform a welding operation. Conventional burning bars can sustain combustion on their own without an electrical current. In all of the flux cored electrodes, a non-compressable flux powder supports the outer metal shell during the forming operation. Without the presence of incompressible material, the electrode would entirely collapse upon itself during the forming operation and not maintain its general circular cross-section. Again, it is well known that a flux cored electrode cannot be used in a cutting operation, especially an exothermic cutting operation which requires presence of an oxidizing material. The purpose of the flux is to generally prevent oxidation of the base metal during the welding operation.

Twisted wire or cable-type burning bars or thermal lances are shown in U.S. Pat. No. 3,591,758 and 3,602,620.

Multiple wire burning bars have been adapted to underwater use and also can be used on dry land. These are shown in U.S. Pat. Nos. 4,069,407; 4,182,947; 4,416,444; 4,391,209; and 4,437,649.

U.S. Pat. No. 4,114,863 discloses an exothermic (electrode) cutting rod featuring a tube within a tube and wires inside the inner tube.

Lastly, a three nested tube configuration for use as an exothermic electrode is sold by the Arcair Company of Lancaster, Ohio under the trademark SLICE.

BRIEF SUMMARY OF THE INVENTION

The present invention pertains to exothermic cutting electrodes or burning bars as they are known in the art. In particular, the present invention provides an electrode that is fabricated by roll forming from a single elongated strip of metal. By roll forming the electrode to a specific shape, a generally cylindrical elongated electrode is achieved which has internal passages to facilitate passing of an oxidizing gas from one end of the electrode normally held by a torch or holder to the other or free end of the electrode which is ignited to produce the cutting flame. The flame when established can be directed against materials of construction to accomplish a cutting, boring, piercing or other severing operation. By selecting the proper width of starting material, enough mass of metal is available to sustain the exothermic reaction. Using an electrode according to the present invention, the exothermic action can be initiated by striking an arc between the electrode and a workpiece or a striker plate in circuit with the electrode while in the presence of oxygen. Thereafter the cutting flame can be maintained even if the electrical current is turned off and the cutting can continue until the electrode is consumed.

BRIEF DESCRIPTION OF THE DRAWING

FIG. 1 is a front elevational view of an electrode according to the present invention.

FIG. 2 is a view taken along the line 2—2 of FIG. 1.

FIG. 3 is an enlargement of FIG. 2.

DETAILED DESCRIPTION OF THE PREFERRED EMBODIMENT

An exothermic electrode or burning bar, according to the present invention, provides a mass of oxidizable metal, and in the presence of an oxidizing gas (e.g. oxygen) and a source of ignition, will produce a flame which can be directed against a workpiece which may be a part of a fixed land structure, marine structure or similar object. In the hands of a skilled operator a cutting, piercing or burning operation can take place. Electrodes according to the present invention can be used to burn, cut or pierce structural materials such as cast iron, steel, concrete and rock, the latter being either natural or synthetic in air or under water.

The exothermic electrodes disclosed and claimed in U.S. Pat. Nos. 4,391,209 and 4,437,649 can be used either underwater or on dry land. Electrodes according to the aforementioned patents can be used in an environment where ignition is facilitated by means of an electric arc and then the electric arc removed without diminishing the exothermic cutting action. The patented electrodes require at least 3 separate pieces (e.g. an inner tube and outer tube and the mass of metal or spring wire) which have to be assembled in a batch-type operation, thus leading to a costly electrode.

This is also the same problem with an electrode of the type shown in U.S. Pat. No. 4,114,863, as well as any electrodes that have a multiple piece construction. Such electrodes require individual assembly.

One form of the present invention is shown in FIGS. 1 and 2, the electrode 10 being fabricated from a single elongated strip of metal by a roll forming operation using a multiple stand roll forming machine as is well known in the art. Referring to FIG. 3, the electrode 10 is roll formed from a flat strip 11 by first forming a generally hook shaped portion 12 on one edge of the strip 11 and a lock seam portion 14 intermediate the hook shaped portion 12 and the free end of the strip 16. The electrode 10 is continuously formed around the hook shape portion 12 in a plurality of convolutions 18, 20 with the free end 16 forced into the lock seam portion 14 to thus achieve a generally cylindrical electrode structure 10. Prior to beginning the roll forming, a portion of the surface of the strip can be indented with a plurality of dimples 22, 24, 26 and 28 to provide spacers between the convolutions of metal 18 and 20 and the hook shaped portion 12 to thus assure a continuous passage extending internally throughout the length of the electrode.

Prior to beginning the roll forming operation the strip can be coined with a transverse depression (not shown) as is well known in the art in order to effect continuous formation of an electrode which can then be broken off to specified individual lengths, the length being determined by the distance between transverse indentations on the strip prior to roll forming.

As shown in FIGS. 1 and 2, the roll forming operation achieves a generally cylindrical electrode having a continuous internal passage through which an oxidizing gas can be passed from one end 30 to the other end 32 (FIG. 1) of the electrode. Electrode 10 has a discontinuous circular outer surface as shown in FIGS. 2 and 3. The outer surface of electrode 10 can be made circular in cross section by flame spraying a metal layer between points 40, 42 (FIG. 3). This will permit a gas tight seal between the electrode and the torch or holder.

In use the electrode can be gripped at either end in a suitable holder such as a SLICE torch sold by the Arcair Company of Lancaster, Ohio. The torch facilitates conduction of electricity through the electrode as well as oxygen down through the center of the electrode. When the electrode is put in the torch or holder and current is conducted to the electrode with either the workpiece in circuit or by means of a separate striker in circuit with the electrode an arc can be struck between the electrode and the workpiece or the striker. When oxygen is present at the free end of the electrode and the arc is struck, burning (exothermic action) of the electrode immediately takes place producing a flame which can be directed at a workpiece to perform a cutting operation thereon.

In order to demonstrate the effectiveness of an electrode according to the present invention, a series of tests were conducted comparing the commercial Arcair exothermic electrode which is a three tube-in-tube-in-tube construction with an electrode such as disclosed in U.S. Pat. No. 4,114,863 with an electrode fabricated in accordance with FIG. 2 of Japanese Patent Publication No. SHO53-5262 and an electrode according to the present invention. For each type electrode an uncoated electrode was compared with an electrode covered with a conventional flux coating.

Set forth in Table I below are the results for cutting tests with these electrodes.

TABLE 1

| SAMPLE | RESULTS | | | | | | | |
|---|---|---|---|---|---|---|---|---|
| | A | B | C | D | E | F | G | H |
| 1 | 28.554 | 28.913 | 1.129 | 0.945 | 100.0 | 100.0 | 100.0 | 100.0 |
| 2 | 21.134 | 21.134 | 0.816 | 0.816 | 74.0 | 73.1 | 72.3 | 86.3 |
| 3 | 36.343 | 36.343 | 1.397 | 1.397 | 127.3 | 125.7 | 123.8 | 147.9 |
| 4 | 34.042 | 34.042 | 1.303 | 1.303 | 119.2 | 117.7 | 116.4 | 137.9 |

NOTES:
Sample 1 Arcair conventional tube in tube in tube electrode.
Sample 2 Electrode according to U.S. Pat. No. 4,114,863.
Sample 3 Electrode according to Japanese Patent Publication SHO53-5262.
Sample 4 Electrode according to present invention.
A. Cut in inches/minute bare electrode.
B. Cut in inches/minute coated electrode.
C. Cut in inches/inch bare electrode.
D. Cut in inches/inch coated electrode.
E. % effectiveness compared to Sample 1 bare electrode (in/min).
F. % effectiveness compared to Sample 1 coated electrode (in/min).
G. % effectiveness compared to Sample 1 bare electrode (in/in).
H. % effectiveness compared to Sample 1 coated electrode (in/in).
All electrodes were ¼ inch diameter-test consisted of cutting ⅜" thick steel plate at 100 psi oxygen in the torch without current in the electrode after the exothermic reaction is begun.

From Table I it is apparent that when the Arcair commercial electrode (tube-in-tube-in-tube design) is used as a base, the rod according to the present invention is clearly superior to it while the electrode according to U.S. Pat. No. 4,114,863 is clearly inferior. A surprising result is that the Japanese patent electrode shows the best burning characteristics. However, an electrode according to the Japanese patent is very expensive to manufacture and thus would not be considered a viable commercial electrode.

As shown in the Table, the electrodes can be used either bare or coated with a flux coating with certain improved properties.

Electrodes according to the invention can be covered with a water impervious coating such as set forth in U.S. Pat. No. 4,391,209 and used for underwater cutting.

While the present invention has been described with relation to a particular roll forming configuration, other roll formed shapes can be utilized to effect an elongated electrode structure, all such roll formed shapes that result in a generally cylindrical shape being encompassed in this disclosure.

Having thus described our invention what is desired to be secured by Letters Patent of the United States is set forth in the appended claims.

We claim:

1. An exothermic cutting electrode for use on land or underwater comprising:
    a single elongated strip of metal roll formed into a generally elongated tubular configuration, said electrode having a central, generally straight portion around which at least two turns of the strip of metal are wrapped, the electrode held together by longitudinal lock seam formed as part of the roll forming process said electrode formed with continuous inner longitudinal passages without using a non-compressible filler.

2. An electrode according to claim 1 including random spacers formed in the strip between the wraps.

3. An electrode according to claim 1 wherein said central straight portion includes a hook shaped portion at one end thereof.

4. An electrode according to claim 1 including a flux coating covering a substantial portion of its outer surface.

* * * * *